(12) United States Patent
Polvi et al.

(10) Patent No.: US 6,937,167 B2
(45) Date of Patent: Aug. 30, 2005

(54) METHOD FOR JOINING A JACKET ELEMENT AND A CORE ELEMENT TOGETHER

(75) Inventors: Veikko Polvi, Pori (FI); Veijo Halminen, Vanha-Ulvila (FI); Tuomo Kivistö, Jorvast (FI)

(73) Assignee: Outokumpu Technology Oy, Espoo (FI)

( * ) Notice: Subject to any disclaimer, the term of this patent is extended or adjusted under 35 U.S.C. 154(b) by 0 days.

(21) Appl. No.: 10/432,001

(22) PCT Filed: Nov. 13, 2001

(86) PCT No.: PCT/FI01/00984

§ 371 (c)(1),
(2), (4) Date: Oct. 30, 2003

(87) PCT Pub. No.: WO02/40749

PCT Pub. Date: May 23, 2002

(65) Prior Publication Data

US 2004/0065721 A1 Apr. 8, 2004

(30) Foreign Application Priority Data

Nov. 17, 2000  (FI) ............................................. 20002523

(51) Int. Cl.$^7$ ................................................ H03M 1/22
(52) U.S. Cl. ...................................... 341/13; 204/288.2
(58) Field of Search .......................... 341/13; 204/288.2

(56) References Cited

U.S. PATENT DOCUMENTS 4,647,358 A * 3/1987 Bartsch et al. ........... 204/288.2

FOREIGN PATENT DOCUMENTS

| DE | 3247830 A1 | 7/1983 |
| DE | 3323516 | 8/1994 |
| WO | WO 00/17419 | 3/2000 |
| WO | WO 02/40749 | 5/2002 |

* cited by examiner

Primary Examiner—Jean Bruner Jeanglaude
(74) Attorney, Agent, or Firm—Morgan & Finnegan, L.L.P.

(57) ABSTRACT

A method for joining a highly electroconductive core element (2) to a jacket element (1) made of refined steel. In said method, the electroconductive core element (2), such as a copper bar, and the joining agent element (3) are inserted in the jacket element (1), and at least the juncture area of the elements to be joined is thermally treated, so that there is created a metallurgical joint between the electroconductive core element (2) and the refined-steel jacket element (1).

13 Claims, 1 Drawing Sheet

METHOD FOR JOINING A JACKET ELEMENT AND A CORE ELEMENT TOGETHER

CROSS-REFERENCE TO RELATED APPLICATIONS

This application claims priority to PCT Application Number PCT/FI01/00984 filed Nov. 13, 2001, and to Finnish Patent Application Number 20002523 filed Nov. 17, 2000.

BACKGROUND OF THE INVENTION

The present invention relates to a method for joining a tube element and a core element together.

The method of the invention can be applied particularly in the manufacturing of the suspension bars for electrodes, particularly for permanent cathodes, used in the electrolysis of metals. The structure of the suspension bar of permanent cathodes and the joining of the plate part of the permanent cathode to the suspension bar is made problematic by the fact that in order to conduct a high electric power to the plate part, the suspension bar must contain some highly electroconductive material, such as copper, because acid-resistant steel has poor electroconductivity, and consequently it cannot be the sole material of the suspension bar. In the patent publication WO 00/17419, there are introduced alternative methods for manufacturing the suspension bar of a permanent cathode. These methods are typically complicated and/or require special devices. In arrangements manufactured according to the methods of the prior art, the electroconductive properties of the joint have not always been maintained in a satisfactory way, especially in the corroding conditions that prevail in the electrolytic processes of metals.

The object of the present invention is to realize a novel method for joining the tube element and the core element together. Another object of the invention is to realize a method that is economical as regards to manufacturing technology and well suited to the targets of usage for manufacturing the suspension bar of an electrode, particularly a permanent cathode.

The arrangement according to the invention is characterized by what is set forth in the appended claims.

The arrangement according to the invention has several remarkable advantages. By means of the method of the invention, there is achieved a good, electroconductive joint between the jacket element with a lower electroconductivity and the core element with a high electroconductivity. The method is easily implemented without special devices. The method is suited to be applied in the manufacturing of products of very different sizes and, on the other hand, in the manufacturing of varying quantities of products.

BRIEF DESCRIPTION OF THE SEVERAL VIEWS OF THE DRAWINGS

The arrangement according to the invention is explained in more detail below, with reference to the appended drawings, where.

DETAILED DESCRIPTION OF THE INVENTION

Figure 1:
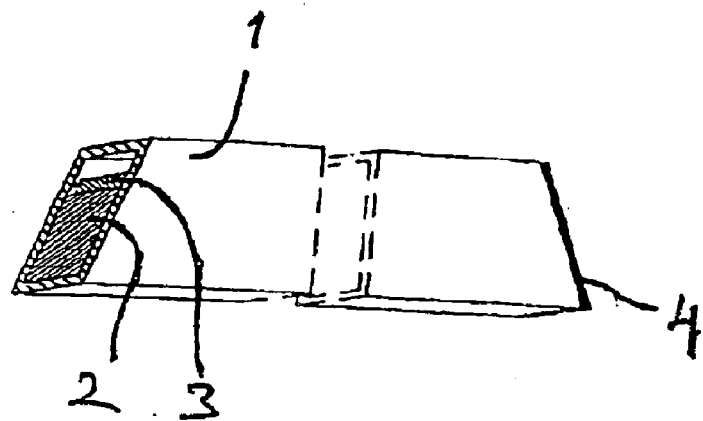
FIG. 1 illustrates a step of a method according to the invention prior to the welding of the second end plate.
Figure 2:
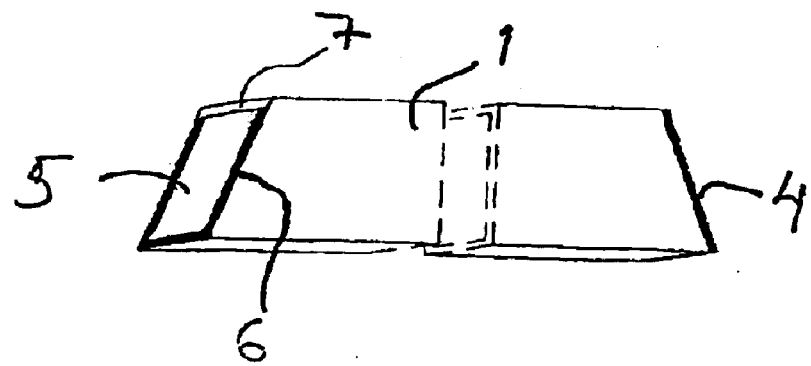
FIG. 2 illustrates a bar according to the invention prior to the heat treatment step.

The invention relates to a method for joining a highly electroconductive core element 2 to a jacket element 1 made of refined steel. In said method, the electrolytic core element 2, such as a copper bar, and the joining agent element 3 are inserted in the jacket element 1 with a poorer electroconductivity, and at least the juncture area of the elements to be joined together is thermally treated so that there is created a metallurgical joint between the electroconductive core element 2 and the refined-steel jacket element 1. The joining agent element 3 is essentially as long as the core element 2. Typically the joining agent element 3 consists mainly of tin. The quantity of the joining agent 3 depends on the size of the clearance between the jacket element 1 and the core element 2, as well as on how large a part of the surfaces between the core element and the jacket element should be joined together.

The jacket element is a tubular element with at least one end that is at least partly closed, at least during the thermal treatment. Typically the first end opening of the jacket element is closed, for instance by welding an end plate 5 thereon after the core element 2 and the joining agent element 3 are inserted in the tube. In the embodiment according to the drawings, also the other end opening of the jacket element is partly closed, for instance by welding an end plate 5 thereon after the core element and the jacket element are inserted in the tube. In that case an opening 7 is left at the end of the jacket element, at least for the duration of the thermal treatment. This can be achieved for instance by leaving the top edge of the welded seam 6 in the second end plate 5 unwelded. Typically the elements to be joined together are kept at an essentially horizontal position during the thermal treatment. Thus the tin, while melting, can penetrate to the whole junction area. During the thermal treatment, the molten tin dissolves copper from the copper bar serving as the core element 2 and creates tin bronze, which simultaneously begins to dissolve the inner surface of the refined steel tube serving as the jacket element 1, thus creating a metallic tin bronze joint between the core element 2 and the jacket element 1. In a typical case, the thermal treatment was carried out in a furnace, the temperature whereof was raised essentially over about 900° C.

According to another preferred embodiment, the thermal treatment of the elements to be joined together is carried out in a position that is essentially other than horizontal. In that case that end of the jacket element that is in a lower position is typically closed, at least up to the height of the desired junction surfaces.

The method according to the invention is suited to manufacturing the suspension bar of an electrode, particularly a permanent cathode. In this specification, the term 'refined steel' refers to stainless or acid-resistant steel. The term 'copper' refers to a material containing mainly copper, i.e. at least 50% copper.

What is claimed is:

1. A method for joining a highly electroconductive core element that mainly consists of copper to a jacket element made of refined steel, the method comprising inserting the electroconductive core element and a joining element that mainly consists of tin into the jacket element, and thermally treating at least a juncture area of the elements to be joined at a temperature sufficient to create a metallurgical joint mainly from tin bronze between the electroconductive core element and the refined-steel jacket element.

2. The method according to claim 1, wherein the copper core element consists of at least 50% copper.

3. A method according to claim 1, wherein the joining element mainly consists of tin.

4. A method according to claim 1 wherein the jacket element is a tube element, and at least one end thereof being at least partly closed, at least during thermal treatment.

5. A method according to claim 1, wherein the core and jacket elements to be joined together are maintained in an essentially horizontal position during the thermal treatment.

6. A method according to claim 1, wherein prior to thermal treatment, the elements to be joined together are in a substantially horizontal position, and the joining element is applied to the surface of the core prior to placement into the jacket element.

7. A method according to claim 1, wherein, during the thermal treatment, the core and jacket elements are maintained in a substantially non-horizontal position.

8. A method according to claim 1, wherein a suspension bar is manufactured for use with an electrode.

9. A method according to claim 1 wherein the electroconductive core element is a copper bar.

10. A method according to claim 8 wherein an electrode is a permanent cathode.

11. The method according to claim 1, wherein during the thermal treatment, molten tin from the joining element dissolves copper from the copper bar to create the tin bronze metallurgical joint.

12. The method according to claim 1, wherein the refined steel is stainless steel or acid-resistant steel.

13. A method for joining a highly electroconductive core element to a jacket element made of refined steel, the method comprising:

inserting the electroconductive core element consisting mainly of copper, and a joining agent element consisting mainly of tin, into the jacket element;

thermally treating in a furnace at a temperature over about 900° C., at least a juncture area of the elements to be joined to create a metallurgical joint, mainly from tin bronze, between the electroconductive core element and the refined-steel jacket element.

* * * * *